United States Patent [19]

Waldron et al.

[11] 4,316,112

[45] Feb. 16, 1982

[54] ELECTRICITY GENERATOR

[75] Inventors: John M. Waldron, Ivanhoe; Frederick J. Nott, Pascoe Vale South; Laurence C. Harrison, Aspley; Graham D. Johnson, East Keilor; Malcolm D. Green, Lyons, all of Australia

[73] Assignee: The Commonwealth of Australia, Department of Productivity, Canberra, Australia

[21] Appl. No.: 37,607

[22] Filed: May 10, 1979

[30] Foreign Application Priority Data

May 10, 1978 [AU] Australia .............................. PD4343

[51] Int. Cl.$^3$ ............................................. H02K 1/12
[52] U.S. Cl. ..................................... 310/258; 310/62; 310/68 R; 310/89; 310/166; 310/216
[58] Field of Search ............... 310/166, 159, 216, 217, 310/218, 254, 258, 259, 68 D, 42, 198, 154, 62, 58, 59, 180, 184, 168, 89, 152, 155, 68 R

[56] References Cited

U.S. PATENT DOCUMENTS

| | | | |
|---|---|---|---|
| 2,399,931 | 5/1946 | Lamborn | 310/259 UX |
| 2,650,316 | 8/1953 | Johns | 310/258 |
| 2,826,730 | 3/1958 | Biffi | 310/258 |
| 3,560,840 | 2/1971 | Stalp | 310/58 |
| 3,970,881 | 7/1976 | Sato | 310/68 D |
| 4,100,440 | 7/1978 | Binder | 310/42 |
| 4,161,775 | 7/1979 | Franz | 310/68 D |
| 4,162,419 | 7/1979 | DeAngelis | 310/68 D |

Primary Examiner—R. Skudy
Attorney, Agent, or Firm—Sughrue, Mion, Zinn, Macpeak and Seas

[57] ABSTRACT

An inductor alternator having a stator formed from an annular yoke with laminated pole pieces secured to the internal periphery thereof by welding through slots in the yoke. The rectifiers for rectifying the alternating current are located in a detachable compartment at one end of the housing containing the stator. The rotor is journaled within the stator by bearings supported in said detachable compartment.

9 Claims, 15 Drawing Figures

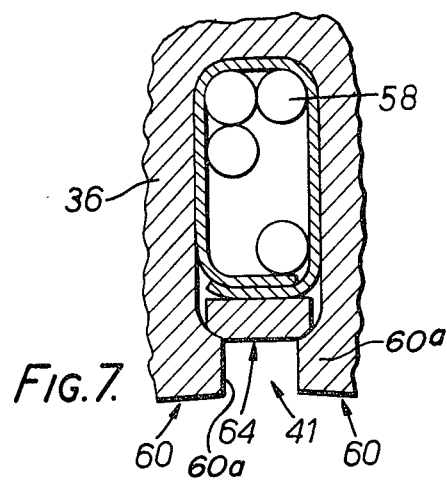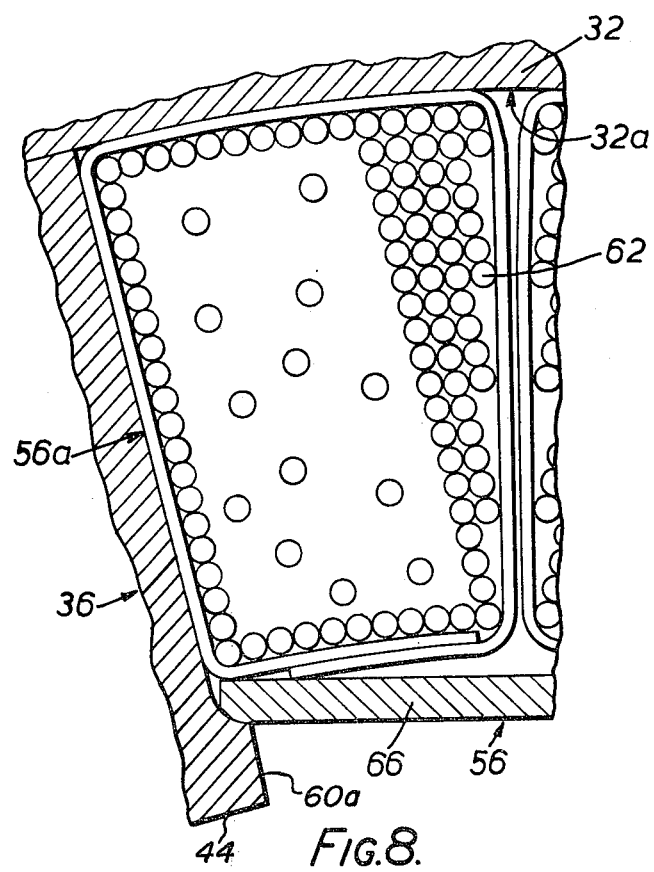

ELECTRICITY GENERATOR

This invention relates to electricity generators of the inductor-alternator type.

Generators of the inductor-alternator type normally employ an annular stator with a core of high magnetic permeability material and field and armature windings wound on the core, and a rotor of high magnetic permeability material. A special difficulty arises with this form of construction in that it becomes difficult to accommodate the necessary field and armature windings on the magnetic core of the stator and it is an object of the invention to provide a core structure which facilitates satisfactory winding of both field and armature windings thereof.

According to the invention there is provided a core structure for an electricity generator of the inductor-alternator type, said core structure defining an annular magnetic circuit and, in use, supporting field and armature windings of the generator, these windings then being accommodated in lengthwise openings provided in the internal periphery of the core assembly, the core assembly being characterised in that it is formed of an outer annular yoke formed from material of high magnetic permeability and with a plurality of separate lengthwise extending stacks of laminations of high magnetic permeability material arrayed about the inner periphery of the annular yoke, the stacks being spaced apart from each other in the circumferential direction of the assembly so as to form a plurality of lengthwise extending spaces therebetween which spaces extend from the inner peripheries of the adjacent pair of stacks to the inner periphery of the yoke and the spaces, in use of the assembly, comprising those of said openings which receive said field winding.

The laminations of each stack may be of arcuate form with slots adjacent the inner peripheral portions thereof, which slots comprise those of said openings which receive the armature winding of the generator. Preferably, the stacks are affixed to the yoke by welding and the yoke and may have a plurality of lengthwise extending slots therein which slots are covered, at the inner periphery of the yoke, by the outer peripheries of the stacks of laminations the stacks being affixed by welding of parts of the outer peripheries of the stacks to inner edges of the slots. This construction permits pre-assembly of the stacks of laminations by alignment of the individual laminations of a stack followed by clamping the laminations, together such as by means of one or more ties extending through aligned apertures in the laminations.

In a preferred method of forming the core structure, the pre-assembled stacks of laminations are held in position prior to welding by positioning them at spaced locations around the inner periphery of the yoke, spacing pieces are positioned between each adjacent pair and a radially expansible element is positioned coaxially of the yoke and expanded to press the stacks against the inner periphery of the yoke after which the said welding is effected.

In another aspect of the invention there is provided an electric generator of the inductor-alternator type comprising an annular stator having field and armature windings and a rotor rotatable within the stator, rectifying means for rectifying alternating current generated in the armature winding during rotation of the rotor and for providing energizing current for the field winding wherein the said rectifying means includes semi-conductor rectifiers mounted within a structure co-axially and removably mounted to one end of the stator. This construction has the particular advantage that the number of electrical conductors which must be taken from the generator for use of the generator need only be the two conductors for the respective positive and negative terminals of the generator whereas, if the rectifying means is provided externally of the generator it will normally be necessary to provide more than this number, depending on the number of armature winding terminals and the number of field winding terminals, and to take these separately to an external rectifying means. The construction thus protects the sometimes numerous conductors which interconnect the rectifying means and the field and armature windings. In a particular preferred embodiment, the generator presents a lengthwise extending passageway for cooling air, one end of said passageway being provided with a fan connected to be driven from the rotor, said passageway communicating with the said compartment so that, in use, the stator, rotor and rectifiers are cooled by air passing into the passageway by operation of said fan. Particularly, the fan may be at one end of the stator and the compartment at the other, the compartment having an opening to the interior of the stator. In this case, the rectifiers may be mounted on heat sinks arrayed about the axis of said stator and within the said compartment adjacent the opening thereof. Other electrical components such as a regulator for regulating field current and a filter assembly for supression of high frequency signals in the output of the generator may also be included in the said compartment. In a particularly preferred form, the regulator is coaxially mounted in the said compartment with the heat sinks arrayed therearound and the filter assembly is removably received in a side aperture of the compartment. The filter assembly may be carried in a removable casing to which casing are attached output terminals of the generator.

The invention is further described with reference to the accompanying drawings in which:

FIG. 7 is an enlarged fragmentary sectional view illustrating the manner of winding of the armature winding onto the stator of FIG. 2;

FIG. 8 is an enlarged fragmentary sectional view showing the manner of winding of the field winding onto the stator of FIG. 2;

Figure 1:
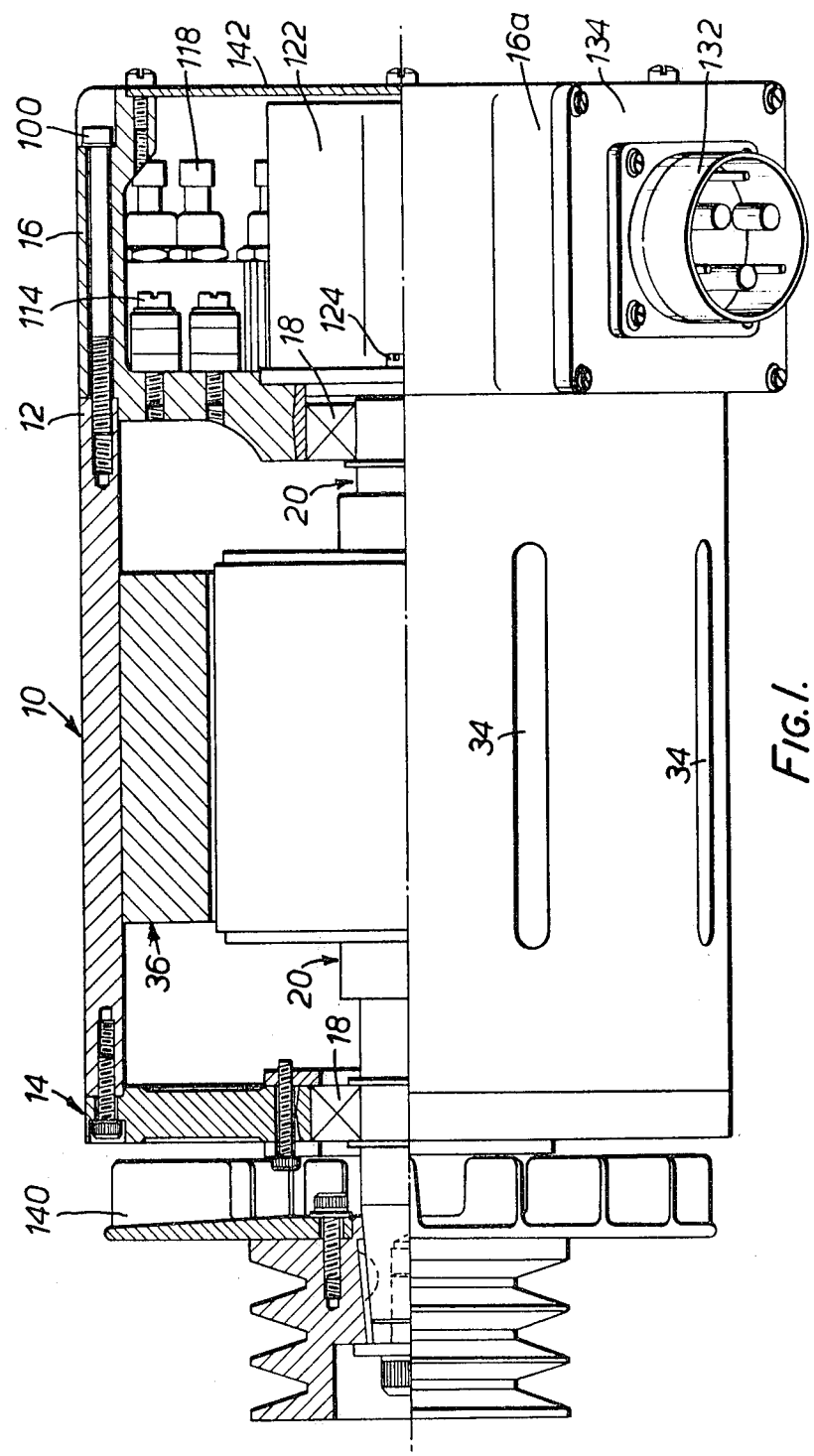
FIG. 1 is a side view, partly sectioned, of a generator constructed in accordance with the invention.
Figure 2:
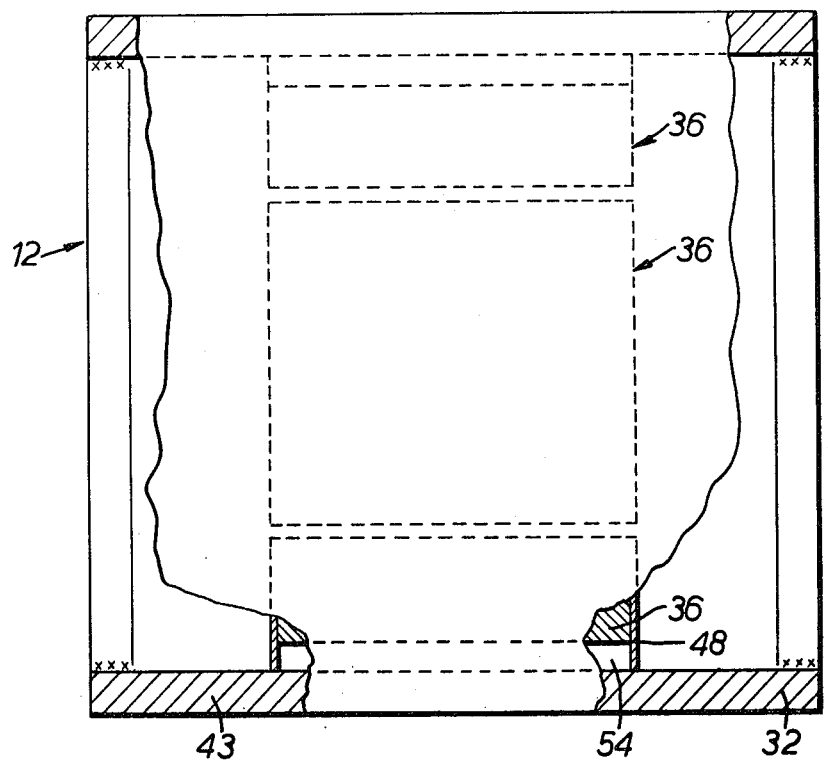
FIG. 2 is a side view of a stator assembly incorporated into the generator of FIG. 1.
Figure 3:
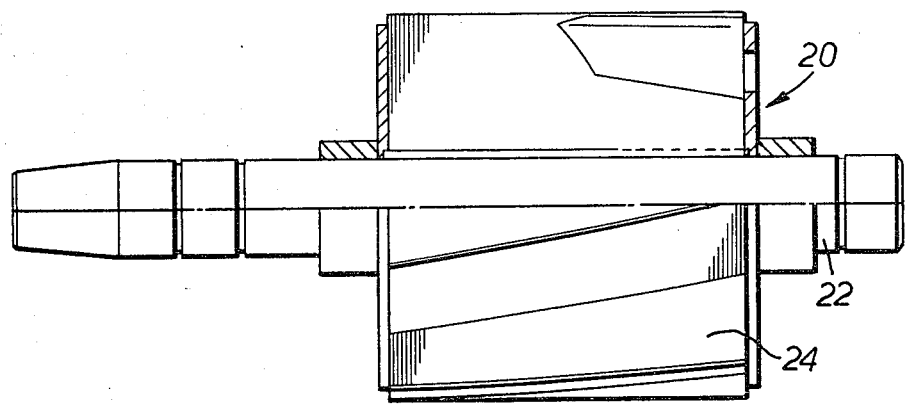
FIG. 3 is a side view, half sectioned, of a rotor incorporated into the generator of FIG. 1.
Figure 4:
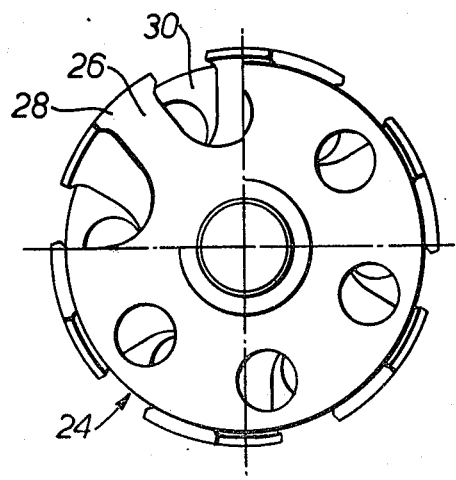
FIG. 4 is an end view of the rotor of FIG. 3.

The generator 10 of FIG. 1 comprises a stator assembly 12 of generally cylindrical form with two end assemblies 14, 16 affixed one to each opposite axial end thereof. Assemblies 14, 16 carry bearings 18.

These bearings support a rotor 20 for rotation coaxially of assembly 12. Rotor 20 comprises a central shaft 22 with a coaxially mounted generally cylindrical stack 24 of steel laminations 26. The laminations 26 are each of like form defining a plurality of peripheral teeth 28 defined between cut out portions 30 in the peripheries thereof.

The stator assembly 12 includes an outer annular yoke 32 of annular cross-section and generally cylindrical outer shape. It has eight lengthwise extending slots 34 extending through the side wall thereof and four stacks 36 of stator laminations 38 are affixed to the inner peripheral surface 32 of the yoke by welds 40 extending along inner edges of the slots and along outer peripheral portions 42 of the stacks 36.

Figure 5:
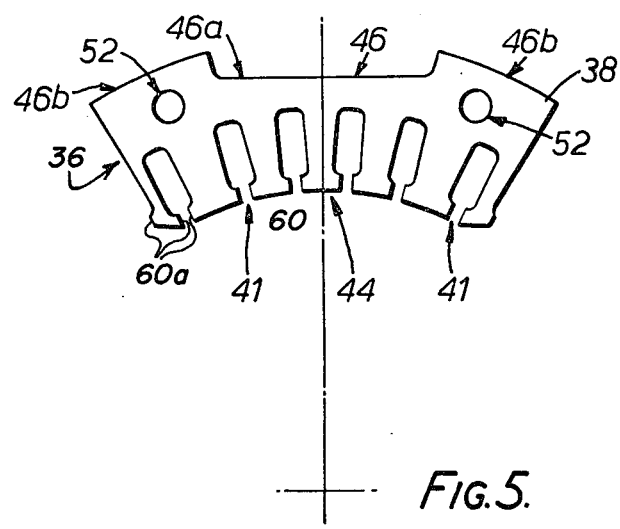
FIG. 5 is a plan view of a lamination incorporated into the stator of FIG. 2.
Figure 6:
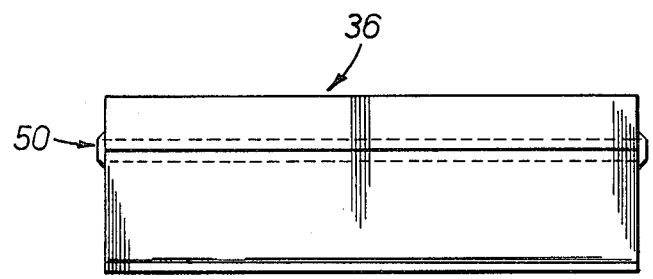
FIG. 6 is a side view of a stack of stator laminations.

Each lamination 38 is of the form best shown in FIG. 5, that is to say of partly arcuate configuration with a plurality of slots 41 extending inwardly from an inner peripheral edge 44 thereof and having an outer peripheral edge 46 with a recessed central portion 46a disposed between arcuate opposite end portions 46b. The laminations in a stack 36 are secured together in aligned disposition and between end plates 48 by two elongate rivets 50 extending through openings 52 in the laminations. When a stack is so assembled, the end portions 46b form the peripheral portions 42 of the stack to which welding is effected to the yoke 32. The recessed central portion 46a of lamination edges 46 are then spaced from the inner peripheral surface 32a so as to define a plurality of lengthwise extending air ventilation ducts 54.

Figure 14:
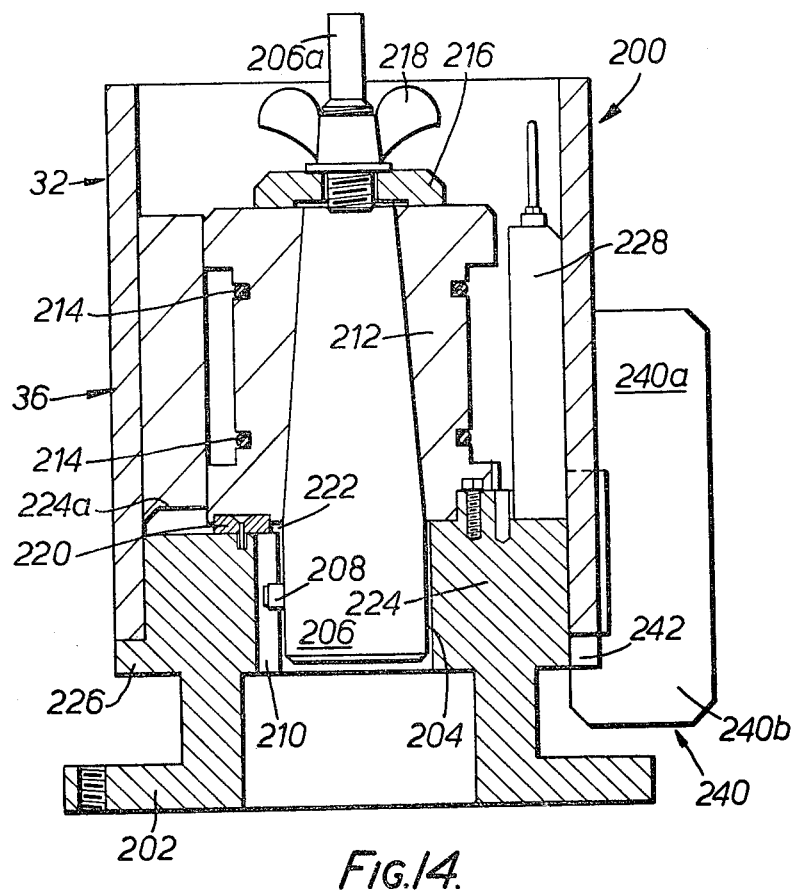
FIG. 14 is an axial section of a jig suitable for assembly of parts of the generator of FIG. 1.

The assembly of the stacks 36 onto the peripheral surface 32 of the yoke can easily be effected by use of the jig 200 shown in FIG. 14. The jig comprises a base 202 with a central bore 204 therethrough. A central shaft 206 is received in bore 204 and extends upwardly therefrom. It is axially slidable in the bore but constrained against rotation by a pin 208 which extends sidewardly therefrom and is received in a lengthwise extending keyway 210 in the bore. The upper part of the shaft is tapered and has arrayed therearound a plurality of jaws 212. The jaws have inner faces of complimentary form to the tapered exterior of the shaft 206. They are held in position around the shaft by circular springs 214 which extend therearound. The upper part of the shaft has a reduced diameter threaded portion 206a. A wing nut 218 is threadedly received on this and a washer 216 is interposed between the wing nut and the jaws 212. By turning the wing nut, it is possible to raise shaft 206 and in so doing, the jaws 212 are radially expanded by cooperation between the tapered exterior of the shaft and the complimentary faces of the jaws. The jaws are guided for such radial movement by keys 220 on base 202 cooperative with keyways 222 in the under-surfaces of the jaws.

The base 202 has a cylindrical upper portion 224 of diameter just less than the inner diameter of yoke 32 and at the base of this an outwardly extending peripheral ledge 226 so that the yoke can be positioned on the ledge and located co-axially with shaft 206, as shown. The distance between the upper transverse surface 224a of portion 224 and the upper surface of the ledge 226 is arranged to be such that when the yoke is so positioned, stacks 36 of laminations 38 can be inserted between the exterior of the jaws 212 and the interior surface of the yoke so that they are accurately axially located relative to the yoke. When so positioned, they can be urged outwardly to the axis of the shaft 206 by tightening of the wing nut 208 to force the stacks against the interior surface of the yoke.

Figure 15:
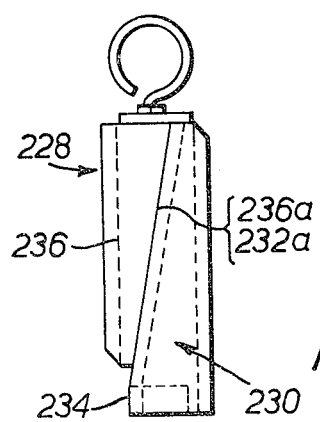
FIG. 15 is a side view of a locator forming part of the jig of FIG. 14.

Accurate circumferential location of the stacks is achieved by the use of a number of locators 228 positioned on the top of base 202 and extending upwardly therefrom at equally spaced locations therearound. As best shown in FIG. 15, these comprise a first part 230 having an upright portion 232 and a sidewardly projecting foot 234 by which part 230 is screwed to the upper surface of base 202. A second part 236 is of elongate form, having an inclined side surface 236a which mates with a corresponding inclined side surface 232a of the part 230. There are so many locators as there are stacks 36 and the locators are interposed in the circumferential direction of the yoke between the stacks, firstly with the part 236 not in position. Then, the parts 236 are positioned on the part 232 and forced downwardly so as to apply circumferential forces to the stacks by virtue of the wedging action between the parts. This accurately establishes the circumferential spacing between the stacks.

There remains the necessity to locate the yoke so that the slots 34 are positioned adjacent the outer peripheral portions 42 of the stacks. This is accomplished before tightening of the wing nut 218 and before the locators 228 have been put into use, by means of a tool 240. This is formed from plate metal of thickness a clearance fit relative to the transverse dimension of the slots 34. It is of generally U-shaped form having a first leg 240a which can be inserted into a slot 34 when the yoke is positioned on the jig and a second leg 240b which can then engage in a suitably positioned notch 242 in ledge 226. The location of the notch 242 is so chosen that when the tool 240 is positioned with leg 240a in a preselected slot 34 and leg 240b is positioned in the notch, the yoke will be positioned with slots 34 positioned adjacent portions 42 of the stacks 36. To use the jig 200, then, yoke 32 is positioned thereon and circumferentially oriented, the stacks 36 are positioned between the fixed parts 232 of the locators 228, the parts 236 are inserted and tapped home to secure the desired circumferential position of the stacks and wing nut 218 is tightened down to radially locate the stacks. Then, the welds 40 can be readily effected.

Figure 9:
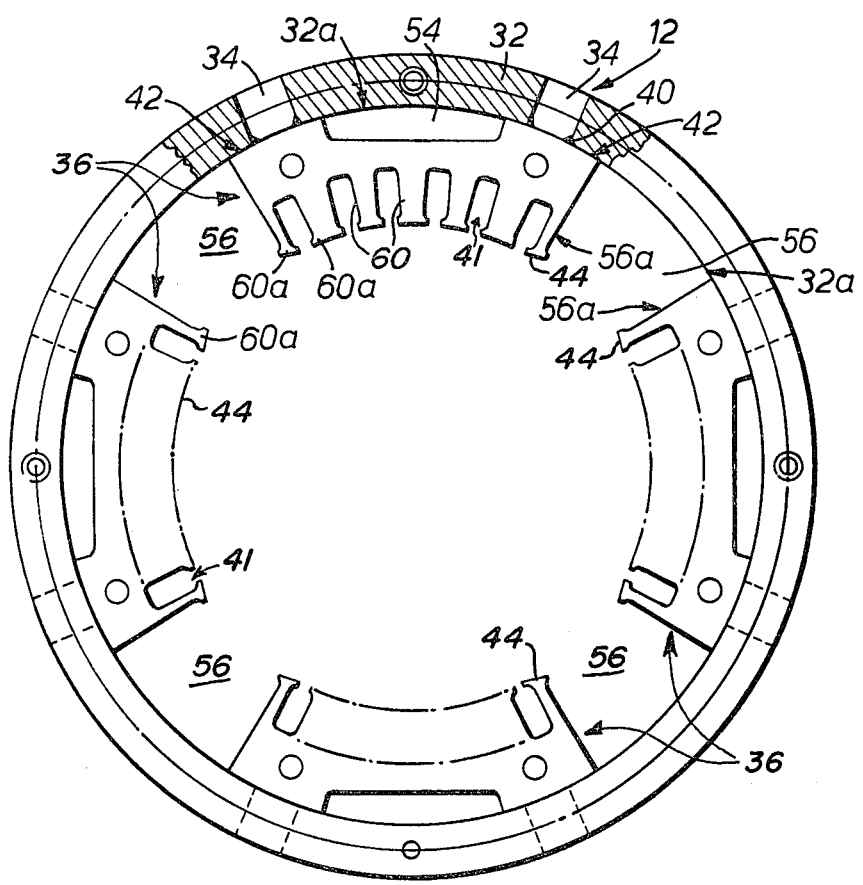
FIG. 9 is an end view of the stator assembly of FIG. 2.

The stacks 36 are symmetrically arrayed about the inner peripheral surface 32a of yoke 32 (FIG. 9) as to define four lengthwise extending slots 56 therebetween, each slot thus being defined by opposed radial side surfaces 56a of a pair of adjacent stacks and by a portion of the inner peripheral surface 32a of the yoke 32. There are three armature windings 160, 162, 164 (FIG. 10) the conductor 58 of one of these windings being accommodated within the aligned slots 41 of a stack as best shown in FIG. 7, the winding following normal practice so as to be looped around teeth 60 defined between the slots 41. There are two field windings 136, 138 (FIG. 10) each consisting of four portions, each such portion comprising a number of turns of wire 62 wound around an associated one of the stacks 36 and accommodated within slots 56 as best shown in FIG. 8. Each slot 56 thus accommodates wires forming parts of the stator winding wound on the two adjacent stacks 36. The wires forming the stator and armature windings are held in position, in a manner known per se, by plates 64, 66 of insulating material, such as bakelite, which are slid lengthwise into the slots 41, 56 and are held in position by inward radial pressure of the windings to cause the plates to bear against sideward extensions 60a of teeth 60.

The generator is a heteropolar machine which operates in a manner known per se, rotation of the rotor 20 causing the teeth 28 thereon to successively sweep past teeth 60 to cause switching of magnetic flux produced by application of current to the field windings. This switching, in turn, induces current into the armature windings. This current may be rectified to produce a direct current output, a portion of which may be applied to energise the field winding.

It will be appreciated that the yoke 32 forms part of the magnetic circuit for the generator since it interconnects the stacks 36. It is this that permits the formation of the remainder of the magnetic circuit of the stator by the discrete stacks 36 rather than, as has hitherto been the practice, by a single stack comprising laminations with portions of the general form of the laminations 38 but defining four arrayed such portions interconnected by small outer peripheral bridging portions. The described construction avoids the need to provide these bridging portions and so results in a greater effective depth for the slots 56 thereby permitting more room for winding the field winding. Furthermore, because the individual stacks can be assembled separately and later aligned as desired for final welding, a very accurate assembly is possible whereas, the prior use of laminations extending around the whole circumference of the stator leads to a greater possibility of inaccurate assembly because the aforementioned bridging portions must be made very narrow to enable any reasonable space to be provided for the field winding so that deformation of the laminations may easily occur during assembly.

Figure 11:
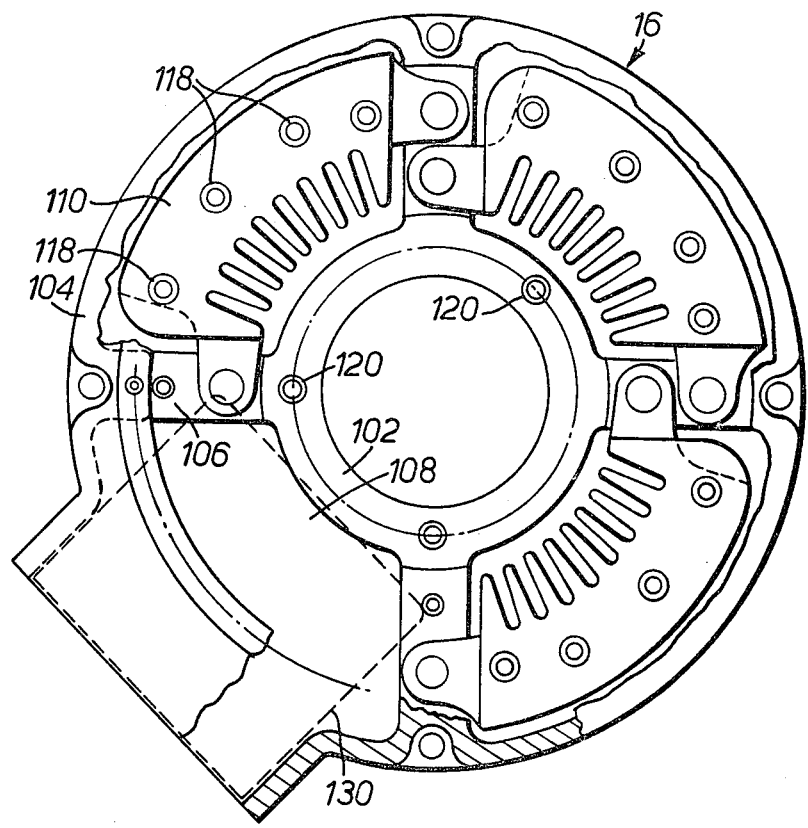
FIG. 11 is a partly sectioned end view of an end assembly incorporated into the figure of FIG. 1.
Figure 12:
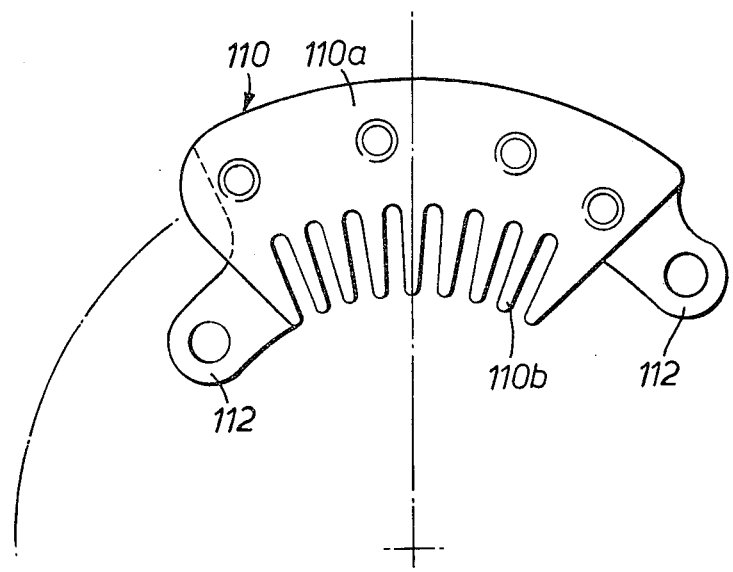
FIG. 12 is a plan view of a heat sink incorporated in the generator of FIG. 1.
Figure 13:
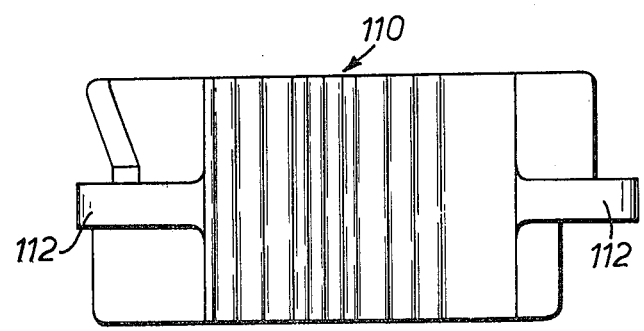
FIG. 13 is a front view of the heat sink of FIG. 12.

A particular feature of the generator shown is that the rectifier for producing a rectified output current and for producing current for the field winding is housed within end assembly 16. The assembly 16 includes a hollow cyclindrical body removably secured on one end of stator assembly by screws 100 which pass through the body and into tapped recesses in the stator assembly. The bearing 18 included in end assembly 16 is fitted into an annular, central, mounting portion 102 of the end assembly this being supported from the peripheral wall 104 of the end assembly by four radial webs 106. It will be seen from FIG. 11 that the webs 106 divide the annular space between portion 102 and wall 104 to define four arcuate apertures 108 of generous proportions at the inner end of the end assembly 16. Three generally correspondingly shaped heat sinks 110 are mounted over respective ones of three of these apertures. As best shown in FIGS. 12 and 13, these include a curved body portion 110A with a plurality of generally radially inwardly projecting fins 110B extending therefrom. Lugs 112 are provided at each end of each heat sink 110 and the heat sinks are positioned in the end assembly by means of screws 114 which extend through these lugs and into tapped openings in the webs 106. Each heat sink 110 has three tapped recesses into which are fitted, respectively, three semi-conductor diodes 118.

The annular portion 102 also has tapped openings 120 therein and an electrical regulator assembly 122 is mounted by means of screws 124 passing through the regulator and into these holes. As will be best seen from FIG. 1, the regulator is in the form of a body which is positioned coaxially over bearing 18 and within the interior of end assembly 16 with the heat sinks 110 arrayed therearound.

Figure 10:
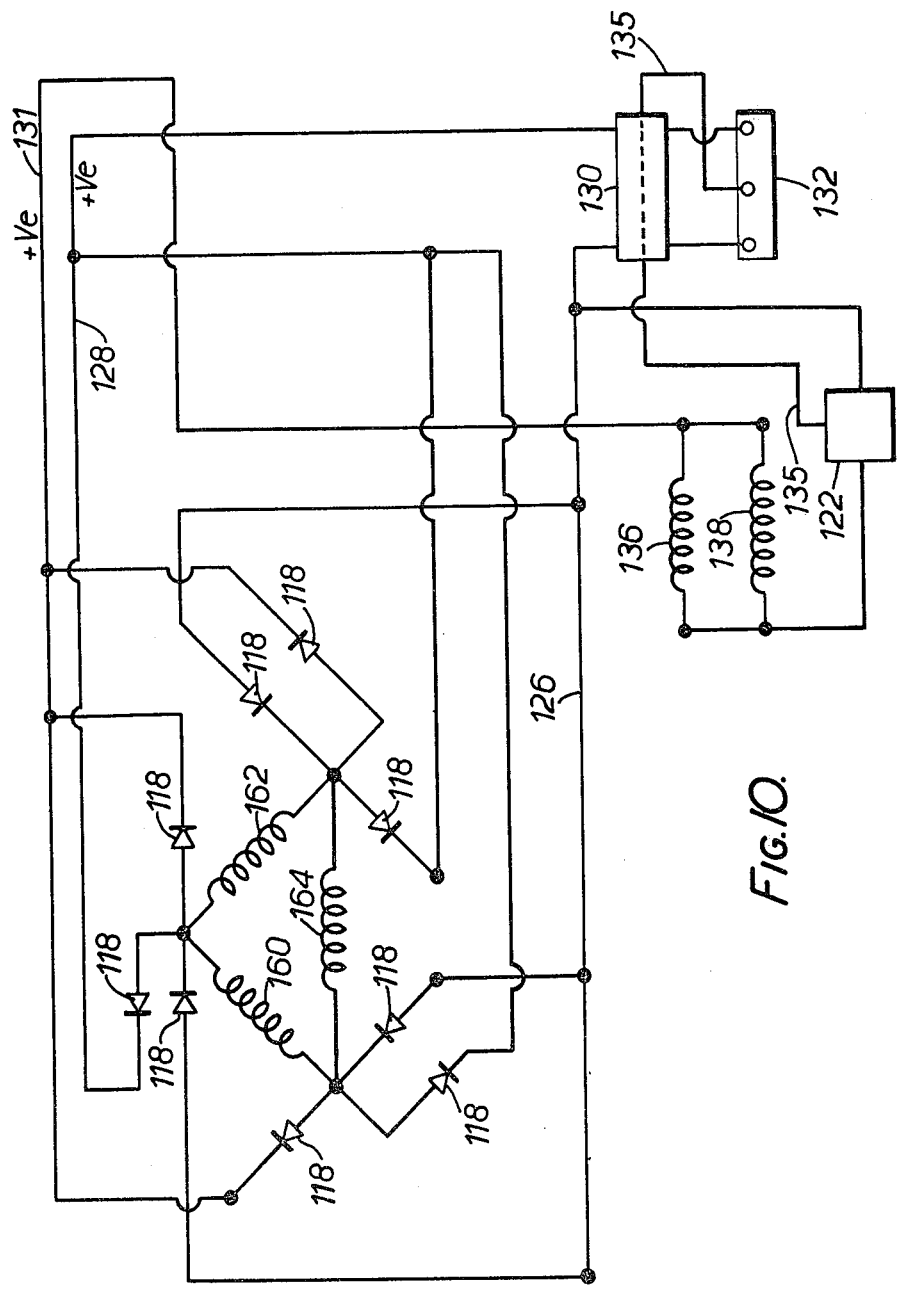
FIG. 10 is a wiring diagram for the generator of FIG. 1.

The electrical wiring for the generator is illustrated in FIG. 10. In this instance, the stator has three armature windings 160, 162, 164 connected in delta configuration. The 9 diodes 118 are connected as shown, that is to say, with three connected to each node of the delta configuration, two at each node being connected with anodes to the nodes and the other with its cathode to the node. The diodes having cathodes connected to the nodes are connected together to form a common negative output line 126 whilst the remaining diodes are connected to form positive output line 128 and a field supply line 131, as shown. The output lines 126, 128 are connected via a high frequency filter 130, for suppression of radio frequency interference, to an output socket 132. Socket 132 is mounted on the exterior of end assembly 16 being positioned on a cover plate 134 which is removably positionable over a sideward extension 16A of the end assembly, the plate carrying on its inner side the encapsulated filter which fits into the sideboard extension 16A at the location 130 illustrated diagrammatically in FIG. 11.

The voltage regulator 122 operates to regulate the output voltage by regulating the field current. It has a sensing lead 135 connected in use to the location at which the regulated voltage is required and operates to regulate output of the generator so that the voltage at the sensed location is at a pre-set level. The regulator is generally of known form; it operates to prevent voltage generation when no voltage is sensed at the sensed location, in order to prevent overload. In the present instance there are two field windings, 136, 138 connected in parallel, these being in series with the regulator across the lines 126, 131. The windings 136, 138 preferably have their ends brought out separately from the stator to enable one to be disconnected if reduced output from the generator is required. In a preferred embodiment one winding has a resistance of seven $\Omega$ and the other has an impedance of four $\Omega$ so that a choice of three operating outputs is obtainable by either parallel connection of the two field windings or by use of either one separately.

The mounting of the diodes, regulator and filter in the end assembly 16 has the particular advantage that all of the wiring from the stator to these parts is protected and no lengthy exterior leads are required as is the case where the rectifier and associated parts are remotely located from the generator itself.

The arrangement of the heat sinks 110 permits easy removal of these in the event of rectifier failure. The described arrangement also permits easy cooling of components in end assembly 16. Thus, the generator shaft 22 carries, at the end projecting from end assembly 14, a fan 140 which is positioned to direct air through end assembly 16. The air enters the end assembly 16 via a perforated end closure plate 142 removably positioned on the end of the end assembly 16, and then flows through the stator assembly 12 and into end assembly 14 from whence it leaves the generator via apertures in the end assembly 14.

We claim:

1. An electrical generator of the inductor-alternator type comprising a stator in the form of an annular magnetic core assembly, a rotor coaxially mounted for rotation within said stator, said core assembly having a plurality of parallel lengthwise slots defined about the inner periphery thereof, field and armature windings of said generator being mounted in said slots, said core assembly comprising an outer annular yoke formed from material having a high magnetic permeability and a plurality of separate lengthwise extending stacks of laminations of material having high magnetic permeability arrayed about the inner periphery of said annular yoke, said stacks being spaced apart from each other in the circumferential direction of said core assembly so as to form a plurality of lengthwise extending slots therebetween extending from the inner peripheries of adjacent pairs of stacks to the inner periphery of said yoke for receiving said field windings, said yoke having a plurality of parallel lengthwise extending slots therethrough in alignment with said stacks whereby said slots are covered at the inner periphery of said yoke by the outer peripheries of said stacks, and said stacks being affixed to said yoke by welds disposed within the lengthwise extending slots in said yoke.

2. An electrical generator as set forth in claim 1 wherein the laminations of each stack are of arcuate form with a plurality of parallel aligned slots adjacent the inner peripheral portions thereof for receiving said armature windings of said generator.

3. An electrical generator of the inductor-alternator type as claimed in claim 1, further comprising rectifying means for rectifying alternating current generated in the armature winding during rotation of the rotor and for providing energizing current for the field winding, and an end assembly having a compartment for receiving said rectifying means coaxially and removably mounted to one end of the stator.

4. An electrical generator as claimed in claim 3, wherein the generator presents a lengthwise extending passageway for cooling air, fan means mounted at one end of said passageway, means connecting said fan to be driven from the rotor, said passageway communicating with the said compartment for cooling the stator, rotor and rectifying means by air passing into the passageway by operation of said fan.

5. An electrical generator as claimed in claim 3 wherein said fan is at one end of the stator and the compartment at other, compartment having an opening to the interior of the stator.

6. An electrical generator as claimed in claim 5 wherein said rectifiers are mounted on heat sinks arrayed about the axis of said stator and positioned within the said compartment adjacent the opening thereof.

7. An electrical generator as claimed in claim 6 wherein a regulator for regulating field current and a filter assembly for suppression of high frequency signals in the output of the generator are also included in the said compartment.

8. An electrical generator as claimed in claim 7 wherein the regulator is coaxially mounted in the said compartment with the heat sinks arrayed therearound and the filter assembly is removably received in a side aperture of said compartment.

9. An electrical generator as claimed in claim 8 wherein said filter assembly is carried in a removable casing to which casing are attached output terminals of the generator.

* * * * *